United States Patent [19]
Smith

[11] 3,821,029
[45] June 28, 1974

[54] BATTERY AND INTERCELL CONNECTOR
[75] Inventor: John William Smith, Sylvania, New South Wales, Australia
[73] Assignee: Chloride Batteries Australia Limited, Padstow, New South Wales, Australia
[22] Filed: Aug. 22, 1972
[21] Appl. No.: 282,782

Related U.S. Application Data
[63] Continuation-in-part of Ser. No. 75,874, Sept. 28, 1970, abandoned.

[30] Foreign Application Priority Data
Oct. 2, 1969  Australia............................ 61781/69
Dec. 5, 1969  Australia............................ 64798/69

[52] U.S. Cl. .............................. 136/134 R, 136/135
[51] Int. Cl. ......................................... H01m 35/32
[58] Field of Search.............. 136/134 R, 135 S, 168

[56] References Cited
UNITED STATES PATENTS
3,303,056  2/1967  Sabatino et al.................. 136/135 S
3,313,658  4/1967  Sabatino et al.................. 136/134 R
3,336,164  8/1967  Miller............................... 136/134 R
3,457,118  7/1969  Miller............................... 136/135 S
3,607,441  9/1971  Mix................................... 136/135 S FOREIGN PATENTS OR APPLICATIONS
1,114,332  5/1968  Great Britain................... 136/134 R Primary Examiner—Donald L. Walton
Attorney, Agent, or Firm—Edwin E. Greigg

[57] ABSTRACT

This invention relates to improvements in electrical connections provided between the terminal connectors on a battery casing and their respective intercell connectors which pass through the intercell walls in multi-cell batteries. The improvement is directed towards the prevention of leakage of electrolyte through the peripheral wall of the battery casing as well as between the cells positioned therein. This is achieved mainly by deformation of the battery casing and intercell walls so that the contact surface between the battery casing and the cell wall and the respective connectors is increased.

6 Claims, 24 Drawing Figures

BATTERY AND INTERCELL CONNECTOR

This application is a continuation-in-part of application Ser. No. 75,874, now abandoned, filed Sept. 28, 1970.

This invention relates to battery terminal connectors and more particularly to a terminal connector arrangement which extends through the outer wall of a single cell or multi-cell battery casing as well as to plate assemblies for use therewith, the latter comprising a plurality of side-by-side alternative positive and negative plates and respective intercell connectors electrically coupling the plates of like polarity, said intercell connectors being adapted so that connectors of opposite polarity in adjoining cells may be electrically coupled through an aperture in a dividing cell wall.

One of the major problems associated with the manufacture of multi-cell batteries and the casings therefor which employ the above type of plate assemblies is to obtain an effective seal between the terminal elements and the plate elements where they pass through the casing wall as well as where the intercell connectors pass through the partitions which subdivide the battery into a plurality of cells.

The seal between a terminal and connector of a multi or single cell battery must withstand the normal vibrational and mechanical stresses imposed on the battery during the normal guaranteed service life. In addition, in conventional thick walled cells a satisfactory sealing is obtained by virtue of the thickness and rigidity of the cell wall. However, in the recently developed batteries having thin walled injection molded thermoplastic cells little control can be exercised over the welding process and particularly in the presence of slight misalignment of the connectors, contact is incomplete around the aperture and consequent incomplete sealing results.

Consequently, a gradual loosening of the tightness of the welded joint from the surrounding thermoplastic material is commonplace to eventually allow electrolyte to migrate to adjoining cells as well as to be permitted to pass from the thermoplastic casing around the area where the terminal connector is assembled to the electrical elements.

Therefore, it is an object of this invention to provide a terminal-connector arrangement which will ensure that an effective seal is created during the joining together of the terminal and connector through an outer wall of the battery casing and further that the seal remains effective during the normal expected guaranteed life.

One form of the invention comprises a terminal connector arrangement for a battery casing comprising an outer wall of the battery casing having an aperture with which the terminal and connector are assembled characterized in that the outer wall is deformed before, during and/or after joining together of the terminal and connector so that the contact surface between the outer wall and the terminal and its associated connector is increased.

According to one embodiment of this invention there is provided a thermoplastic material outer wall of a battery casing in which there is a preformed aperture wherein the material surrounding the aperture is displaced to form a final shape to increase the area of the outer wall material which is in contact with a unit size terminal and the interiorly disposed connector. One form in which the displaced outer wall material can take around the aperture is similar to that of a truncated cone. The displaced section of material fits into a recess already created in the design of a connector so that the final engagement of the connector to the displaced section surrounding the aperture forms a common boundary. Alternatively, the base of the terminal may be recessed instead of the connector, which may depend upon the direction of displacement of the outer wall material.

Accordingly, the invention in its broadest form comprises not only a terminal connector arrangement which is disposed between the electrical plate elements of the battery casing and the exterior lead wire therefor, but also an intercell connector arrangement for multi-cell batteries comprising an intercell wall having an aperture through which the intercell connector passes characterized in that the battery wall as well as the cell wall is deformed before, during and/or after joining together of the intercell connector so that the contact surface between the cell wall and the interconnector cell is increased.

With the above principal object in view, there is provided according to one form of the present invention a shaped and preformed aperture through the battery casing wall as well as the dividing cell wall of thermoplastic material in which the material surrounding the aperture is displaced to form a final shape to increase the area of wall material in contact with a unit size connector. One form which the displaced material can take around the aperture is similar to that of a truncated cone, a shape that will be illustrated in this invention to be representative of all shapes formed by displacing the material around the aperture. The displaced section of material fits into a recess already created in the design of the connector so that the final fitment of the connector to the displaced section surrounding the aperture forms a common boundary.

There may be provided a plate assembly of a single or multi-cell battery wherein at least one connector has a face disposed so as to be directed toward an outer wall of the battery casing, and in addition thereto at least one intercell connector may also have a face disposed so as to be directed towards a dividing wall of a cell in which the assembly is located, the dividing wall having an aperture, and a portion of the intercell connector entering the said aperture but not necessarily projecting completely through the aperture. That part of the connector which enters the aperture of the wall of the battery casing abuts with the base of the terminal, whereby upon welding the abutting connector and terminal the molten connector and/or terminal material fills the aperture through which the terminal and connector abut. Further, that portion of the connector which abuts a face of a protuberance on a recess connector permits welding the abutting intercell connectors together causing the molten connector material to fill the apertures through which the connectors abut.

More specifically, in one form of the invention the aperture through the dividing cell wall is preformed to a shape by the displacement of cell wall material surrounding the aperture to lengthen the labyrinth path which the electrolyte must traverse to achieve intercell leakage. At the same time the area of the dividing cell wall in contact with a unit size intercell connector is increased to improve the mechanical strength of the adjoining welded intercell connectors in withstanding vibrational and other stresses imposed on the battery in service. With conventional thick-walled cells a satisfactory seal and adequate mechanical strength was created by the thickness of the surrounding cell wall material, but this advantage was lost once welded connectors were introduced into thin walled injection molded to thermoplastic cells, consequently common practice has been to increase the thickness of the dividing cell wall either around the vicinity in which the material connection will be made or to increase the thickness of the whole wall above that normally associated with thin walled injection molded thermoplastic cells. Thus, it will be understood that the problem of the gradual loosening of the tightness of the seal created by the welding of the terminal elements relative to the battery casing wall as well as the intercell connectors to the surrounding cell wall material is reduced by encapsulating the displaced material surrounding the aperture within the confines of unit size intercell connectors.

Conveniently the recess in the face of the various connectors is of a shape which provides a recessed cavity into which fits the displaced material surrounding the aperture in the center of which is a protuberance on the recessed face projecting laterally from the assembly, and the contiguous connector has a protuberance projecting laterally from the assembly, the relative arrangement of said protuberances being such that upon location of respective plate assemblies in adjoining cells of the battery case the protuberances of one plate assembly will extend partly through the aperture in the dividing cell wall and abut the protuberance emanating from the recessed intercell connector on the other plate assembly so that molten connector material fills the aperture to form a seal between the intercell connectors and cell wall while at the same time the terminal connector will be properly disposed in the battery casing wall to further provide a seal therewith.

The abutting face of each protuberance of adjoining intercell and terminal connectors has a raised knife edge surface traversing centrally across the face of each protuberance and rotated away from parallel contact so that on abutment of the two adjoining protuberances the two centrally positioned raised knife edges cross each other at a weld contact point from which the welding process commences. Ultimately the welding contact spreads across the whole surface area of each abutting protuberance with the displacement of the molten or semi-molten material filling the clearance void between the protuberance and the aperture.

Conveniently the outside rim of the recess cavity in the intercell and terminal connectors is designed to impinge or penetrate into the material during the welding together of abutting protuberances when pressure is applied to the respective connectors in an axial direction of the protuberances as they move towards one another. Finally, after completion of the welding process a substantial post distortion pressure may be applied to the welded connectors abutting opposite sides of the dividing cell wall and battery casing in the same axial direction of the protuberances to form a pressure seal between the material and the adjoining connectors of all material encapsulated within the confines of the connectors. This creates a tighter labyrinth seal and stabilizes the distortion of the material within the confines of the respective connectors caused by the partial penetration of the said rim into the material.

The invention will be more readily understood from the following description of one practical exemplary arrangement of the plate assembly as illustrated in the accompanying drawings. The inventive concept is not limited to this specific description.

Figure 1:
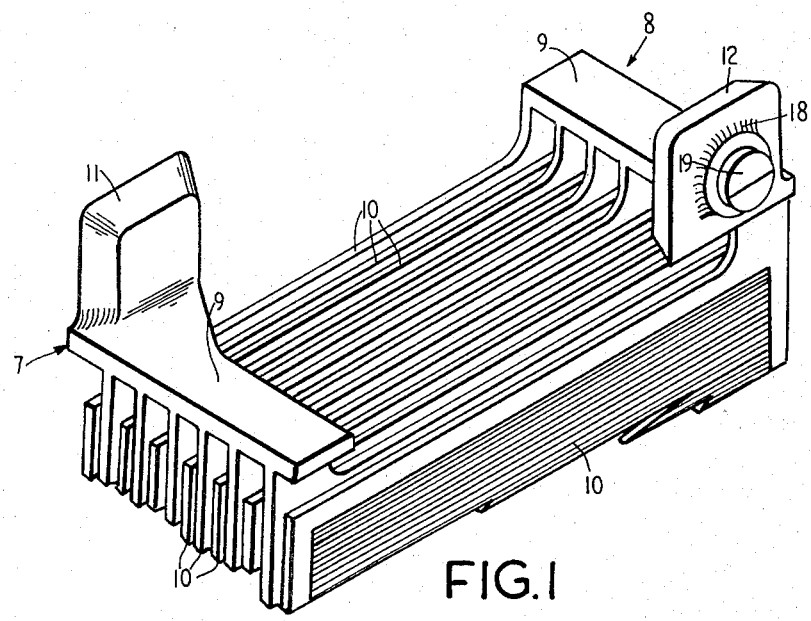
FIG. 1 is a perspective view of the plate assembly.
Figure 2:
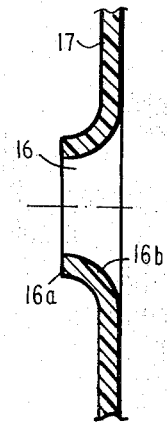
FIG. 2 is a sectional view of one of the many forms possible by the displacement of cell wall material surrounding the aperture.
Figure 3:
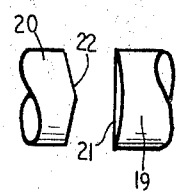
FIG. 3 is a view of the abutting faces of the protuberances projecting laterally from each adjoining connector.

Referring now to the drawings each intercell connector 7 and 8 is generally L-shaped with the respective longer legs 9 dispersed across the top end of the assembly plates 10. The longer leg of the connector 7 is welded to the edge of all plates of like polarity and the longer leg of connector 8 is welded to the edge of the plates of the other like polarity.

The shorter leg 11, 12 of each intercell connector projects upwardly from the assembly of plates and has a vertical outer face 13, 14 substantially parallel to and displaced laterally from the plane of the respective opposite sides of the assembly.

The vertical face 13 of the intercell connector 7 is provided with a circumferential recess 15 arranged to receive the terminal portion 16a of the offstanding collar 16b surrounding the preformed aperture 16 in cell wall 17. The corresponding face 14 of the adjoining intercell connector 8 is provided with an offstanding protuberance 18 projecting substantially perpendicular to face 14. The protuberance is of circular cross section and tapered to substantially follow the contour of the preformed aperture 16. The taper is greater at the inner portion 18, this greater taper extending over approximately one-half of the length of the protuberance.

Figure 4:
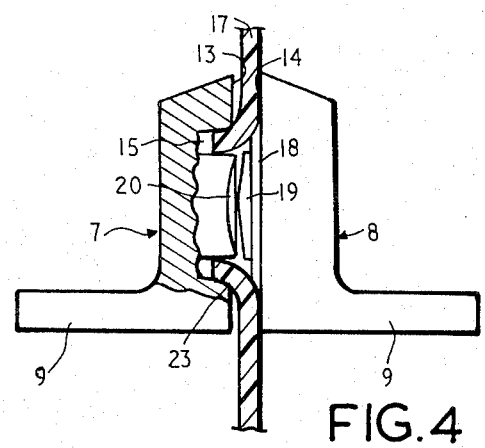
FIG. 4 is a sectional view of two connectors of opposite polarity in abutting relationship ready for welding.
Figure 5:
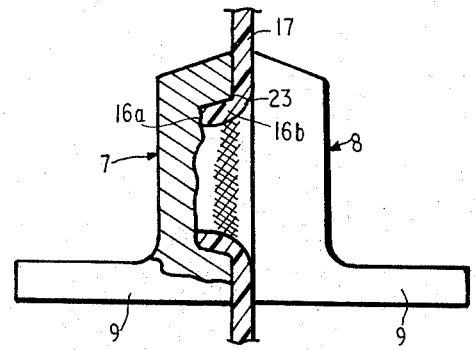
FIG. 5 is a view similar to FIG. 4 after the two connectors of opposite polarity have been welded together.
Figure 6:
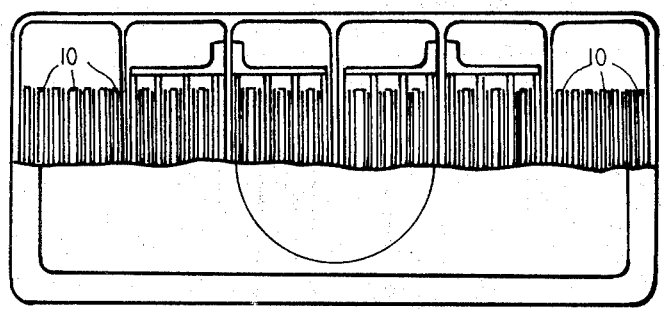
FIG. 6 is a sectional view of a battery incorporating plate assemblies of the construction shown in FIGS. 1 to 5.
Figure 7:
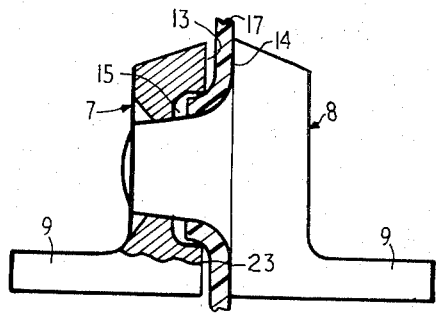
FIGS. 7 and 8 are before and after views of a connector arrangement which is particularly suitable for gas welding.
Figure 8:
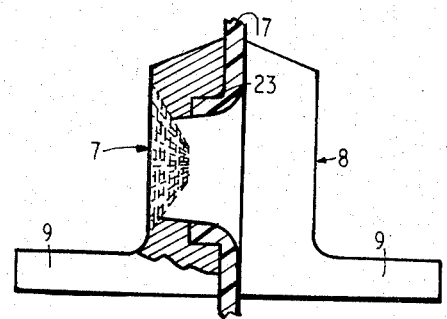

The relative disposition of the annular recess 15 in the intercell connector 7 and the protuberance 18 in the adjoining intercell connector 8 is such that when two identical plate assemblies are positioned in adjoining cells of a multi-cell battery case as seen in FIGS. 4 and 6, they align with the preformed aperture 16 in the wall 17 dividing the two cells. The diameter of the aperture 16 is such that the inner greater taper portion 18 of the protuberance 19 will freely enter the preformed aperture 16 passing into the aperture so that the outer face of the protuberance 19 with knife edge 21 will abut the knife edge 22 on the protuberance 20 defined by recess 15.

The abutting intercell connectors 7 and 8 are welded together by electrical resistance welding in the usual manner, and during the welding operation pressure is applied to the intercell connectors in an axial direction of the protuberance so that they move towards one another until the faces 13 and 14 abut the opposite sides of the cell wall 17, and permit rim 23 on intercell connector 7 to partly penetrate into the thermoplastic cell wall material. This movement causes portions of each protuberance which are in a molten or semi-molten state to make intimate contact with the inner surface of the preformed aperture.

Figure 11:
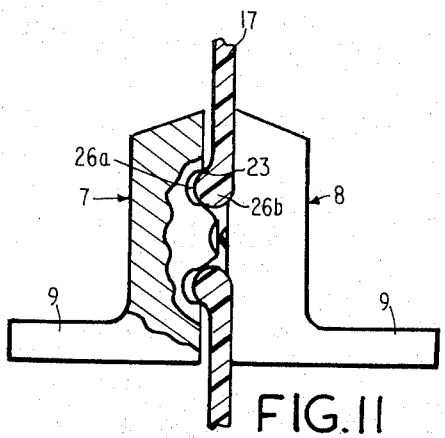
FIGS. 11 and 12 show another arrangement wherein the cell wall is distorted.
Figure 12:
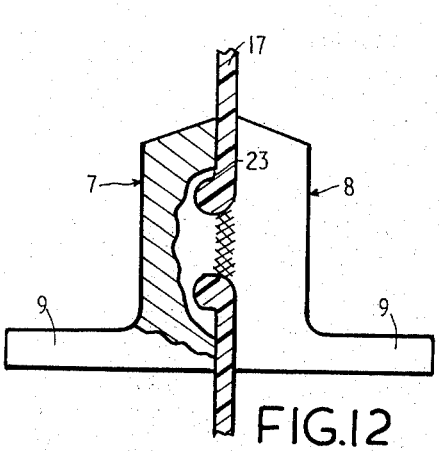
Figure 15:
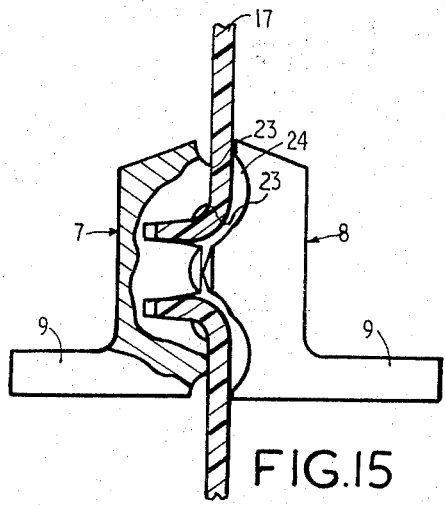
FIGS. 15 and 16 show another arrangement wherein the cell wall is distorted.
Figure 16:
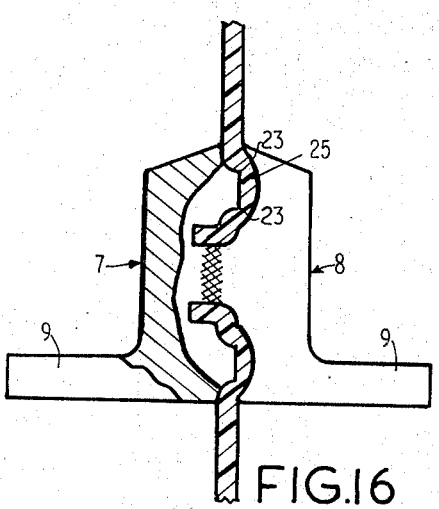
Figure 9:
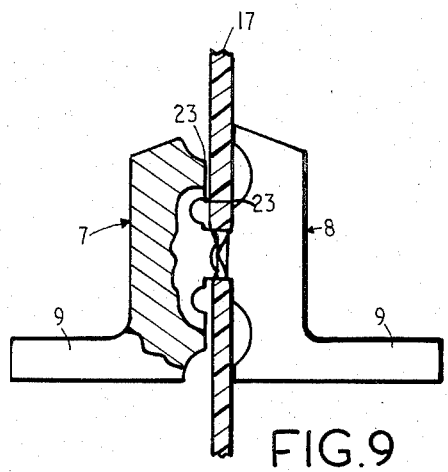
FIGS. 9 and 10 are before and after views illustrating how the cell wall is distorted during the welding process by the application of pressure on the connectors.
Figure 10:
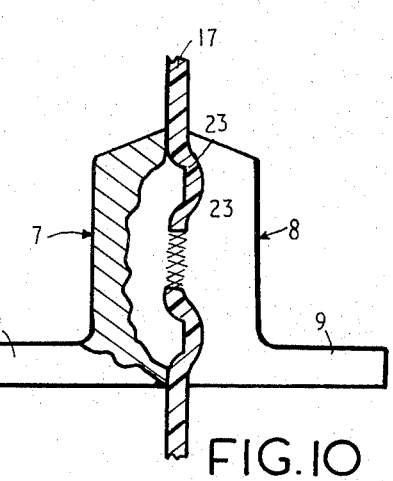
Figure 13:
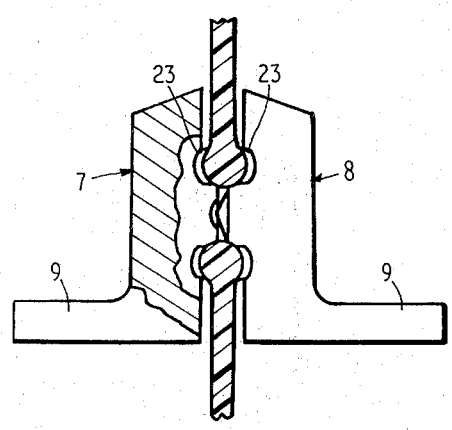
FIGS. 13 and 14 show a further arrangement wherein the cell wall is distorted.
Figure 14:
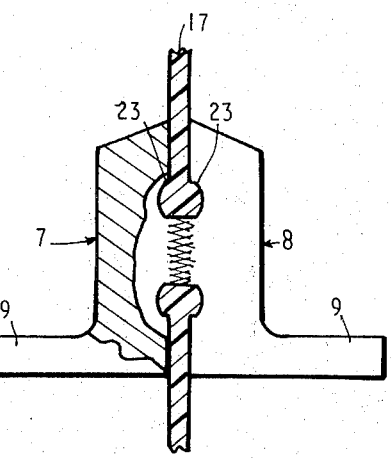

The collar 16b and its terminal portion 16a may be bulbous as shown in FIG. 11 at 26b and 26a, for example. Also connector 8 may have a recess 24 surrounding projection 18 to receive an annular portion 25 of the partition wall 17, as shown in FIGS. 15 and 16, for example.

The displaced material so formed is an integral part of the intercell connectors, and due to the heat and pressure present during the welding operation, adheres to or contours closely to the adjoining material of wall 17. Finally the substantial post distortion pressure applied to the welded intercell connectors 7 and 8 along the same axial direction as the welding process completes the intimate seal of all surfaces of the cell wall 17 encapsulated within the confines of the intercell connectors 7 and 8 and completes the final penetration of rim 23 into wall 17.

It is understood that the shape of the preformed aperture is not limited to that described and illustrated, but includes all shapes created when the surrounding thermoplastic cell wall material is displaced around the aperture to increase the contact surface area between the connector and the intercell wall.

It is further understood that the shape of the intercell connector is not limited to that described and illustrated, but includes all shapes which when two adjoining intercell connectors are welded together through the dividing cell wall, the cell wall material surrounding the aperture is encapsulated within the confines of the intercell connectors.

It is further understood that the shape of the face of each protuberance is not limited to that described and illustrated, but includes all such shapes which when two intercell adjoining protuberances abut together there is presented a small central contact point on which the welding process can commence, even when the abutting protuberances located within the aperture are not fully aligned along the axial direction in which the welding pressure is initially applied.

It is further understood that the final shape of the displaced cell wall material surrounding the aperture when encapsulated within the confines of the intercell connectors is not limited to that described and illustrated, and need not be the same shape as that of the original preformed aperture prior to welding the intercell connectors together. The shape can be altered during the welding operation when pressure is applied to the intercell connectors in an axial direction of the protuberances as they move towards one another, and/or during the application of the post distortion pressure along the same axial direction.

It is further understood that the rim or rims surrounding the recess is not limited to that described and illustrated, but includes all shapes that when the faces of the adjoining intercell connectors abut opposite sides of the cell wall, the rim or rims partly penetrates into the thermoplastic cell wall material. Also the rim or rims need not necessarily be restricted to only one of the two adjoining intercell connectors but could also apply to both connectors.

The connectors may be joined by resistance welding, gas welding or riveting provided the joining creates a seal between the cell wall and the connectors.

Figure 17:
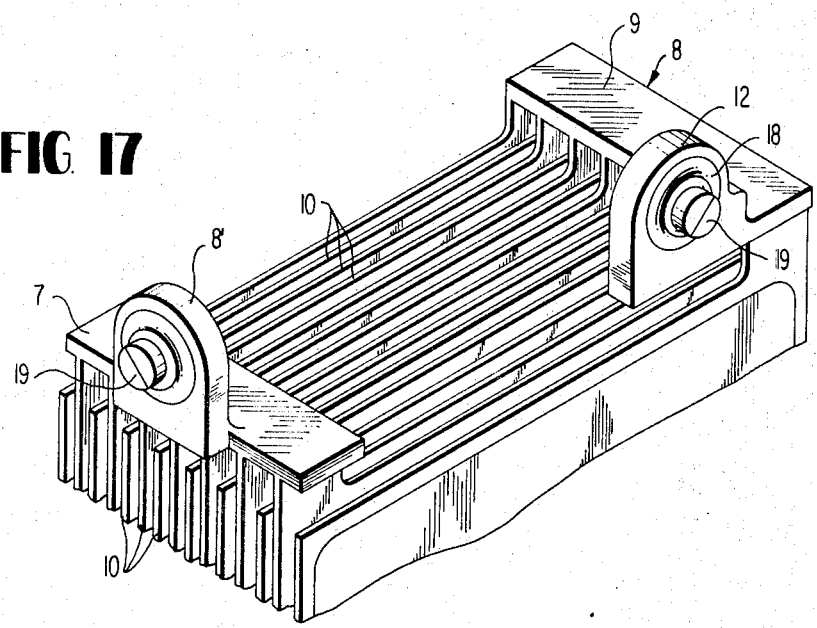
FIG. 17 is a perspective view of a modified embodiment of the plate assembly.

In the embodiment of the invention in FIG. 17 there is shown another perspective view of a plate assembly generally similar to FIG. 1 except that the connector 11 of FIG. 1 has been repositioned on the leg 9 and turned at a 90° angle so that it can be brought into operative relation with the aperture in the peripheral wall of the battery casing, all of which will be better understood as the description progresses.

Figure 18:
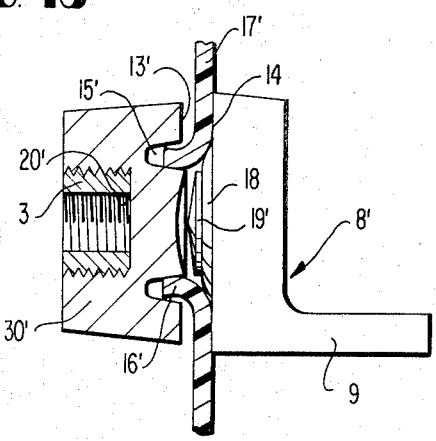
FIG. 18 is a sectional view of an interior connector and a terminal connector in abutting relationship ready for welding.

As explained earlier herein relative to the various intercell connectors, the first connector 8' of FIG. 18 that projects towards the battery casing wall and referred to supra is substantially identical in design to that connector shown in FIG. 4. However, the view of FIG. 18 depicts the protuberance 19' associated with an aperture in the battery casing wall 17'. This view also shows that a collar 16' has been formed around the aperture and projects outwardly and thus is arranged to be received in the circumferential recess 15' of the terminal or second connector means 30'.

Figure 19:
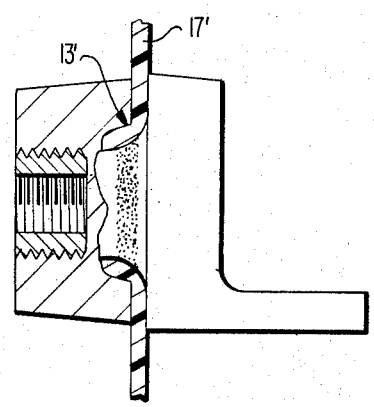
FIG. 19 is a view similar to FIG. 18 after the interior connector and terminal connector have been welded together.

By now comparing at this time FIG. 18 with FIG. 19, the latter view showing the finished assembly operation, it will be seen that the rim 13' has been advanced into contact with the wall of the battery casing and caused it to be deformed and molded into the circumferential recess 15' by the heat and pressure brought about as a result of the welding operation.

Further, the views in FIGS. 18 and 19 illustrate a threaded type of fitting for assembly of the electrical leads therewith and the views in FIGS. 20 through 23 disclose a friction type fitting, neither of which is limitative in design, but merely illustrative of various concepts of electrical lead attachments that are possible to be used in obtaining current from the battery.

Figure 20:
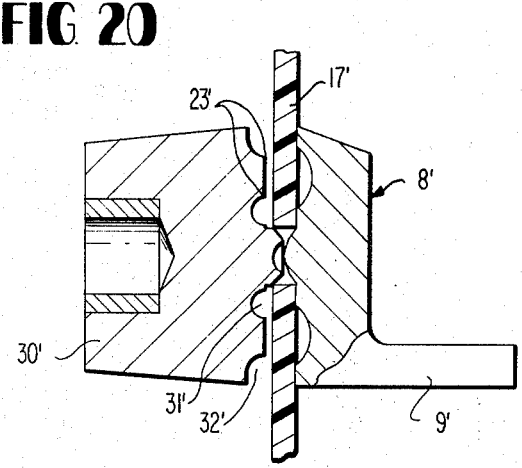
FIGS. 20 and 21 are sectional views illustrating the appearance of the battery casing wall before and after the welding process by the application of pressure on the connector and terminal.
Figure 21:
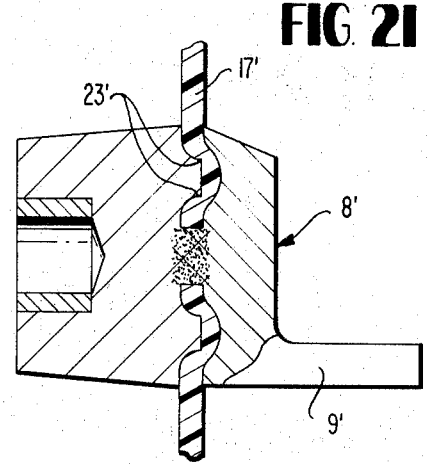

In FIG. 20 there is shown another embodiment of the invention wherein the first connector 8' is provided with a nose portion which will enter the aperture in the battery casing 17' and thereafter the terminal connector having the rim 23' surrounded by annular grooves 31' and 32' is brought into forcible engagement with the first connector 8' and the heat and pressure ensuing from the welding operation (see FIG. 21) bonds the deformed walls of the battery casing in leak-proof engagement with the first and second or terminal connector.

Figure 22:
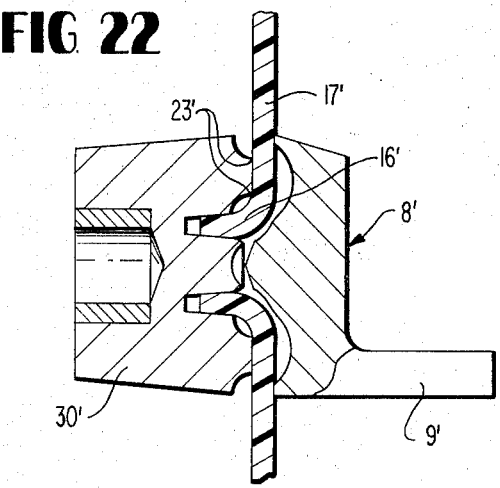
FIGS. 22 and 23 show another arrangement wherein the connector and terminal are assembled with the battery casing wall.
Figure 23:
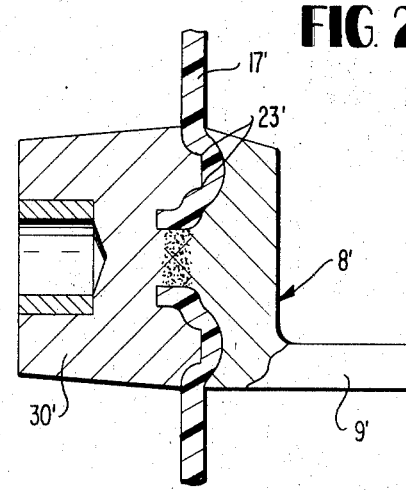

Referring now to the assembly shown in FIGS. 22 and 23, it will be observed that these views are comparable to those of FIGS. 15 and 16 where a similar type of intercell connector interlocking arrangement is shown.

In FIG. 22 the apertured battery casing wall 17' is provided with an outwardly projecting collar 16' that is arranged to be received in the circumferential recess 15', the latter being surrounded by the annular rim 23'-23'. As explained earlier, when the welding operation is performed (see FIG. 23) the collar of the casing wall will be depressed into the circumferential recess and the rim 23'-23' will bite into the wall of the casing 17' to thereby provide a leakproof seal between the terminal 30', the peripheral wall of the battery and the electrical connector 8'.

Figure 24:
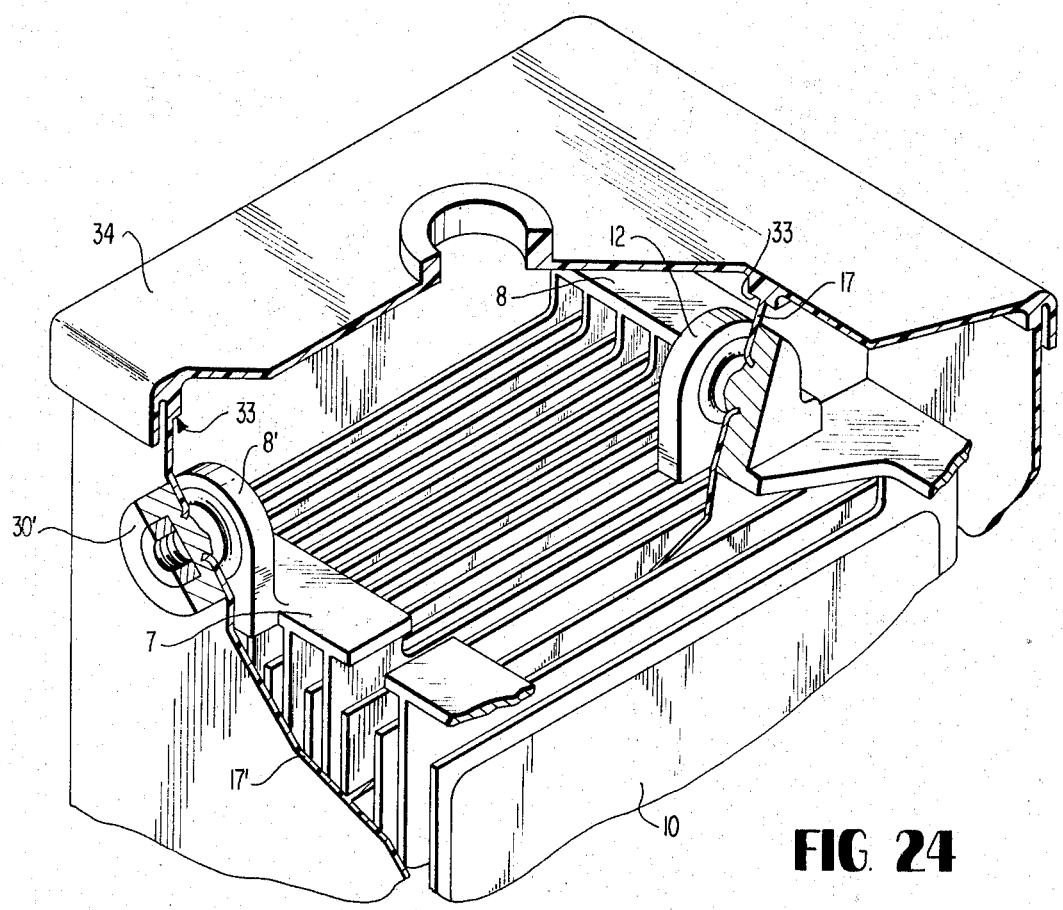
FIG. 24 is a perspective view partially in cross section of a battery casing showing the intercell and terminal connections.

FIG. 24 illustrates a cutaway view in perspective of a portion of a multi-cell battery clearly showing how, on the one hand, the intercell connectors are locked into sealing engagement with the partition member 17 while, on the other hand, the connector 8' is welded into sealing engagement through the aperture in the battery casing wall 17' to the terminal connector 30'.

Upon installation of the cells within the battery casing and all the operations being performed to provide a satisfactory assembly as narrated above, a relatively rigid sealing cement is disposed between the ledge 33 and the cover 34 to form a substantially rigid continuous bond between the peripheral wall of the battery casing as well as the partitions between the respective cells.

That which is claimed is:

1. A battery construction for electrically connecting the plate elements of a storage battery comprising, a pair of intercell connectors, one connector having an offstanding protuberance, the second connector having a circumferential recess, a partition between said connectors, said partition having means defining an aperture therein and an offstanding collar surrounding said aperture and including a terminal portion, the means defining said aperture in said partition encompassing the protuberance on said one connector with the terminal portion of said collar being forced into the recess in said second connector, the protuberance on said one connector contacting and being welded to said second connector.

2. A battery construction as claimed in claim 1, wherein the second connector includes an offstanding protuberance which contacts and is welded to said protuberance on said one connector.

3. A battery construction as claimed in claim 2, wherein the protuberances each includes a knife edge portion prior to welding.

4. A battery construction as claimed in claim 1, wherein the protuberance on said one connector extends through an opening in said second connector.

5. A battery construction as claimed in claim 1, wherein said one connector includes an annular recess area surrounding said protuberance, an annular portion of said partition being forced into said annular recess.

6. A battery construction as claimed in claim 1, wherein the terminal portion of the collar includes an annular bulbous area.

* * * * *